(12) United States Patent
Kulkarni et al.

(10) Patent No.: US 11,182,400 B2
(45) Date of Patent: Nov. 23, 2021

(54) ANOMALY COMPARISON ACROSS MULTIPLE ASSETS AND TIME-SCALES

(71) Applicant: International Business Machines Corporation, Armonk, NY (US)

(72) Inventors: Kedar Kulkarni, Bangalore (IN); Padmanabha V. Seshadri, Bangalore (IN); Satyam Dwivedi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 16/420,806

(22) Filed: May 23, 2019

(65) Prior Publication Data

US 2020/0372024 A1 Nov. 26, 2020

(51) Int. Cl.
*G06F 16/2458* (2019.01)
*G06F 16/901* (2019.01)

(52) U.S. Cl.
CPC ........ *G06F 16/2477* (2019.01); *G06F 16/901* (2019.01); *G06F 16/9024* (2019.01)

(58) Field of Classification Search
CPC . G06F 16/2477; G06F 16/901; G06F 16/9024
USPC ........................................................ 707/758
See application file for complete search history.

(56) References Cited

U.S. PATENT DOCUMENTS

| | | | |
|---|---|---|---|
| 7,191,073 B2 | 3/2007 | Astley et al. | |
| 7,639,714 B2 | 12/2009 | Stolfo et al. | |
| 7,853,433 B2 | 12/2010 | He et al. | |
| 9,075,713 B2 | 7/2015 | Jones et al. | |
| 9,218,232 B2 | 12/2015 | Khalastchi et al. | |
| 9,727,821 B2 | 8/2017 | Lin et al. | |
| 9,787,705 B1 | 10/2017 | Love et al. | |
| 10,587,633 B2 | 3/2020 | Muddu et al. | |
| 2012/0041575 A1 | 2/2012 | Maeda et al. | |
| 2013/0282336 A1 | 10/2013 | Maeda et al. | |
| 2016/0117502 A1 | 4/2016 | Reed et al. | |
| 2017/0028593 A1 | 2/2017 | Maruyama | |

(Continued)

OTHER PUBLICATIONS

Harpale, Abhay et al., A Textual Transform of Multivariate Time-Series for Prognostics; arXiv:1709.06669; Cornell University Library; Sep. 19, 2017.

(Continued)

*Primary Examiner* — Evan Aspinwall
(74) *Attorney, Agent, or Firm* — Ryan, Mason & Lewis, LLP (57) ABSTRACT

Methods, systems, and computer program products for anomaly comparison across multiple assets and time-scales are provided herein. A computer-implemented method includes obtaining time-series data for each one of a plurality of assets; determining, for each of a plurality of time scales, one or more segments of the time-series data for each one of the plurality of assets; generating a graph for each one of the time-scales, the graph representing similarities between the one or more segments of the plurality of assets for the respective time-scale; computing an isolation metric for each of the generated graphs for at least one of the plurality of assets; aggregating the computed isolation metrics for the at least one asset; and determining whether the at least one asset is anomalous, based at least in part on a comparison of the aggregated isolation metric to a threshold.

20 Claims, 9 Drawing Sheets

(56) References Cited

U.S. PATENT DOCUMENTS

| | | | |
|---|---|---|---|
| 2017/0284896 | A1 | 8/2017 | Harpale et al. |
| 2018/0219888 | A1* | 8/2018 | Apostolopoulos ........................... H04L 63/1425 |
| 2018/0220314 | A1 | 8/2018 | Chen et al. |
| 2018/0367551 | A1 | 12/2018 | Muddu et al. |
| 2020/0005096 | A1 | 1/2020 | Calmon et al. |
| 2020/0082013 | A1* | 3/2020 | Triplet ................ G06K 9/6219 |
| 2020/0099709 | A1 | 3/2020 | Vasseur et al. |
| 2020/0162503 | A1* | 5/2020 | Shurtleff ............. H04L 41/0654 |
| 2020/0285997 | A1 | 9/2020 | Bhattacharyya et al. |
| 2020/0287914 | A1* | 9/2020 | Swanson ................ G06F 16/285 |
| 2020/0336499 | A1 | 10/2020 | Kulkarni et al. |

OTHER PUBLICATIONS

Steemwinckel, Bram et al., Towards Adaptive Anomaly Detection and Root Cause Analysis by Automated Extraction of Knowledge from Risk Analyses, Proceedings of the 9th International Semantic Sensor Networks Workshop co-located with 17th International Semantic Web Conference (ISWC 2018), Monterey, CA, United States, Oct. 9, 2018.

Jayarajah, Kasthuri et al., Discovering anomalous events from urban informatics data, Proceedings of SPIE: 8th Ground/Air Multisensor Interoperability, Integration, and Networking for Persistent ISR, 10190, Anaheim, United States, Apr. 10-13, 2017.

Idé, Tsuyoshi et al., Multi-task Multi-modal Models for Collective Anomaly Detection, 2017 IEEE International Conference on Data Mining (ICDM), New Orleans, LA, 2017, Nov. 18-21, 2017, pp. 177-186.

Idé, Tsuyoshi et al.; Change detection using directional statistics, In Proceedings of the Twenty-Fifth International Joint Conference on Artificial Intelligence (IJCAI'16), Gerhard Brewka (Ed.). AAAI Press, Jul. 9, 2016.

Ahmad, Subutai et al., Unsupervised Real-Time Anomaly Detection for Streaming Data, Neurocomputing, vol. 262, Jun. 2, 2017, pp. 134-147, ISSN 0925-2312.

Konishi,, Tatsuya et al., CityProphet: city-scale irregularity prediction using transit app logs. In Proceedings of the 2016 ACM International Joint Conference on Pervasive and Ubiquitous Computing (UbiComp '16). ACM, New York, NY, USA, Sep. 12, 2016, pp. 752-757.

Alzantot, Moustafa et al., Sensegen: A deep learning architecture for synthetic sensor data generation, In 2017 IEEE International Conference on Pervasive Computing and Communications Workshops (PerCom Workshops), pp. 188-193. IEEE, 2017.

Giridhar, Prasanna et al., ClariSense+: An enhanced traffic anomaly explanation service using social network feeds, Pervasive and Mobile Computing, vol. 33, Dec. 2016 (available online Apr. 6, 2016), pp. 140-155, ISSN 1574-1192.

Zhang, C. et al., A Deep Neural Network for Unsupervised Anomaly Detection and Diagnosis in Multivariate Time Series Data, arXiv preprint arXiv:1811.08055, Nov. 20, 2018.

Urosevic, V. et al., Temporal clustering for behavior variation and anomaly detection from data acquired through IoT in smart cities, Recent Applications in Data Clustering. IntechOpen, Aug. 1, 2018.

List of IBM Patents or Patent Applications Treated as Related, dated Jul. 31, 2019.

\* cited by examiner

ANOMALY COMPARISON ACROSS MULTIPLE ASSETS AND TIME-SCALES

FIELD

The present application generally relates to information technology and, more particularly, to detecting anomalies across assets based on time-series data.

BACKGROUND

Internet of things (IoT) refers to a network of devices that include, for example, electronics, software, sensors, actuators and connectivity which allows these things to connect, interact and exchange data. There is an increasing number of applications of IoT in consumer, commercial, industrial and infrastructure spaces. IoT applications will often rely on many assets (for example, sensor devices) and it is often difficult to detect anomalies across such assets, thereby leading to increased costs to remediate such anomalies and inefficiencies in the IoT system.

SUMMARY

Example embodiments of the subject matter described herein provide techniques for anomaly comparison across multiple assets and time-scales are provided. An exemplary computer-implemented method includes obtaining time-series data for each one of a plurality of assets; determining, for each of a plurality of time scales, one or more segments of the time-series data for each one of the plurality of assets; generating, for at least one of the assets, a graph for each respective one of the time-scales representing similarities between the one or more segments of the at least one asset for the respective time-scale; computing an isolation metric for each of the generated graphs for the at least one asset; aggregating the computed isolation metrics for the at least one asset; and determining whether the at least one asset is anomalous based at least in part on a comparison of the aggregated isolation metric to a threshold.

Another exemplary computer-implemented method includes obtaining time-series data for each asset within a set of assets; determining, for each of a plurality of time scales, one or more segments of the time-series data for each one of the assets in the set; calculating, for each respective time-scale, similarities between the segments of the time-series data in the respective time-scale; for each given asset in the set: (i) determining an isolation metric based at least in part on whether the one or more segments of the given asset for a given time-scale are anomalous based at least in part on said similarities, (ii) aggregating the isolation metric for the given asset across the plurality of time-scales, and (iii) marking the given asset as anomalous in response to the isolation metric satisfying a threshold; grouping assets that are marked as anomalous into one or more groups said grouping is based at least in part on comparisons of the anomalous segments of the anomalous assets; and identifying one or more common root causes of said anomalous assets based at least in part on said grouping.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Detecting anomalies across multiple assets presents a number of challenges. Existing techniques generally rely on basic subject matter expert (SME) guided rules and are limited to process management (PM) use cases. In general, such techniques do not account for process and asset operations to detect anomalies across assets over data streams and are computationally intensive because, for example, they do not effectively reuse models and methods across asset classes. Additionally, such techniques rely on single time-scale methods which limit their ability to identify anomalies. Therefore, a need exists for fast processing of data streams to ensure periodic anomaly flagging across assets.

The exemplary embodiments herein describe techniques for anomaly comparison across multiple assets and time-scales. One or more of the example embodiments described herein allow rapid unsupervised anomaly comparison across multiple assets (for example, multiple IoT devices) and time-scales using offline batch processing and on-the-fly, incremental processing of multi-modal data streams.

According to one or more embodiments of the subject matter described herein, asset time-series data are compared at multiple time-scales. For example, a plurality of time-scales may be generated using a binary splitting process and, for each time scale, a distributional distance between multivariate time-series segments is computed. In at least one embodiment, a graph for each time scale is generated using the distributional distances to identify aggregated asset isolation across time scales to determine anomalous asset(s).

Leveraging asset isolation allows identification of assets with anomalies across different time-scales. Techniques using uni-scale methods fail to identify these types of anomalies. Further, a multi-scale approach facilitates grouping of assets based on the nature of the anomaly exhibited by the assets. For instance, a pair of assets that are anomalous and closely located within a graph cluster indicates that the assets have the same anomalous cause.

At least one example embodiment of the subject matter described herein re-uses computational fragments within time-evolving trees generated across multiple time-scales. The time-evolving trees may be generated using a binary splitting method, for example.

At least some of the example embodiments of the subject described herein utilize one or more of: time-series segmentation techniques (such as time-based clustering and/or variable value based clustering, for example); a graphical Gaussian model to learn statistical distribution of multivariate time-series data; and unsupervised graph clustering techniques to cluster segments of the time-series dataset (such as spin-glass, hierarchical and PAM (partition around medoids) clustering, for example).

Figure 1A:
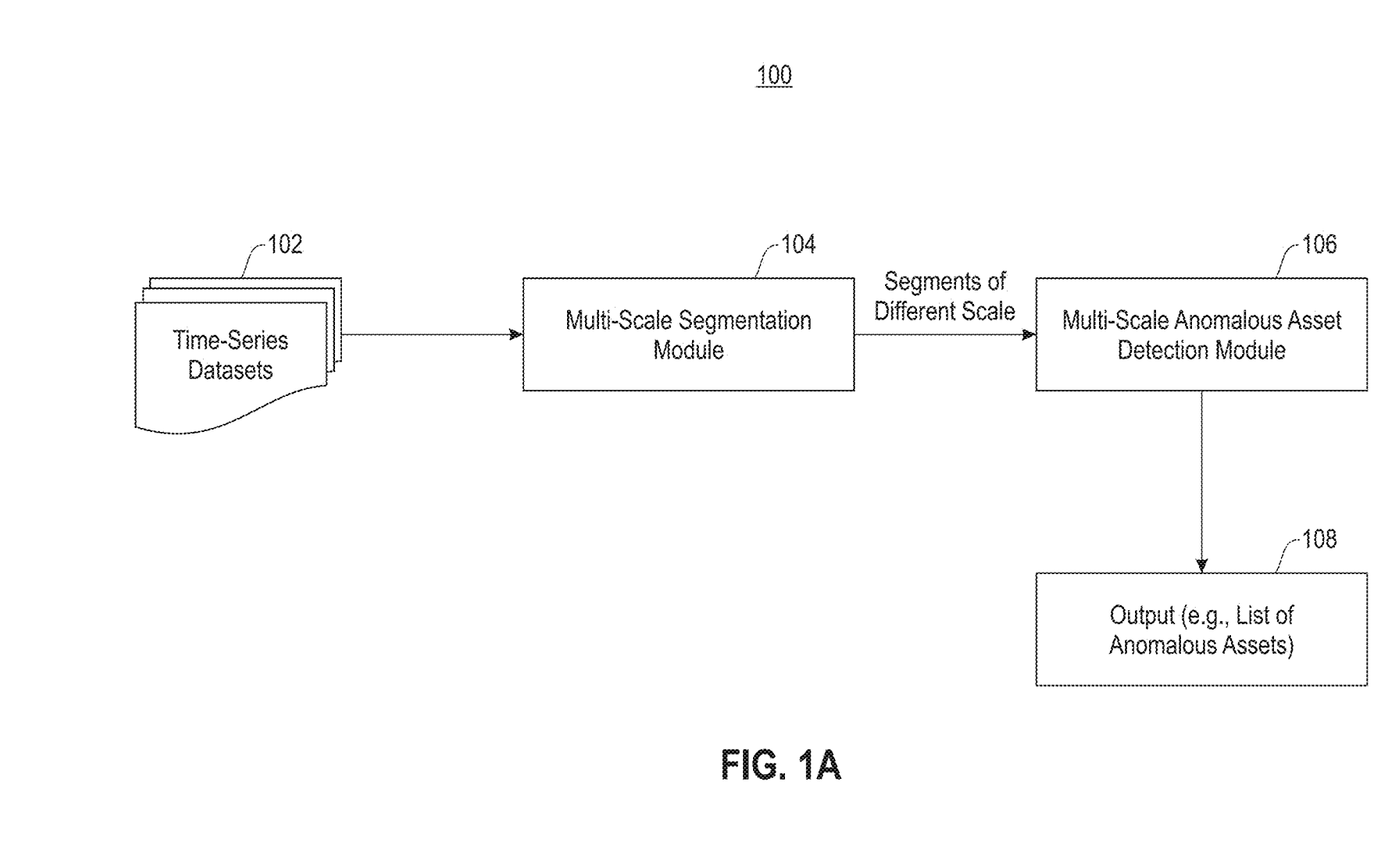
FIGS. 1A-1B are diagrams illustrating system architectures in accordance with one or more example embodiments.
Figure 1B:
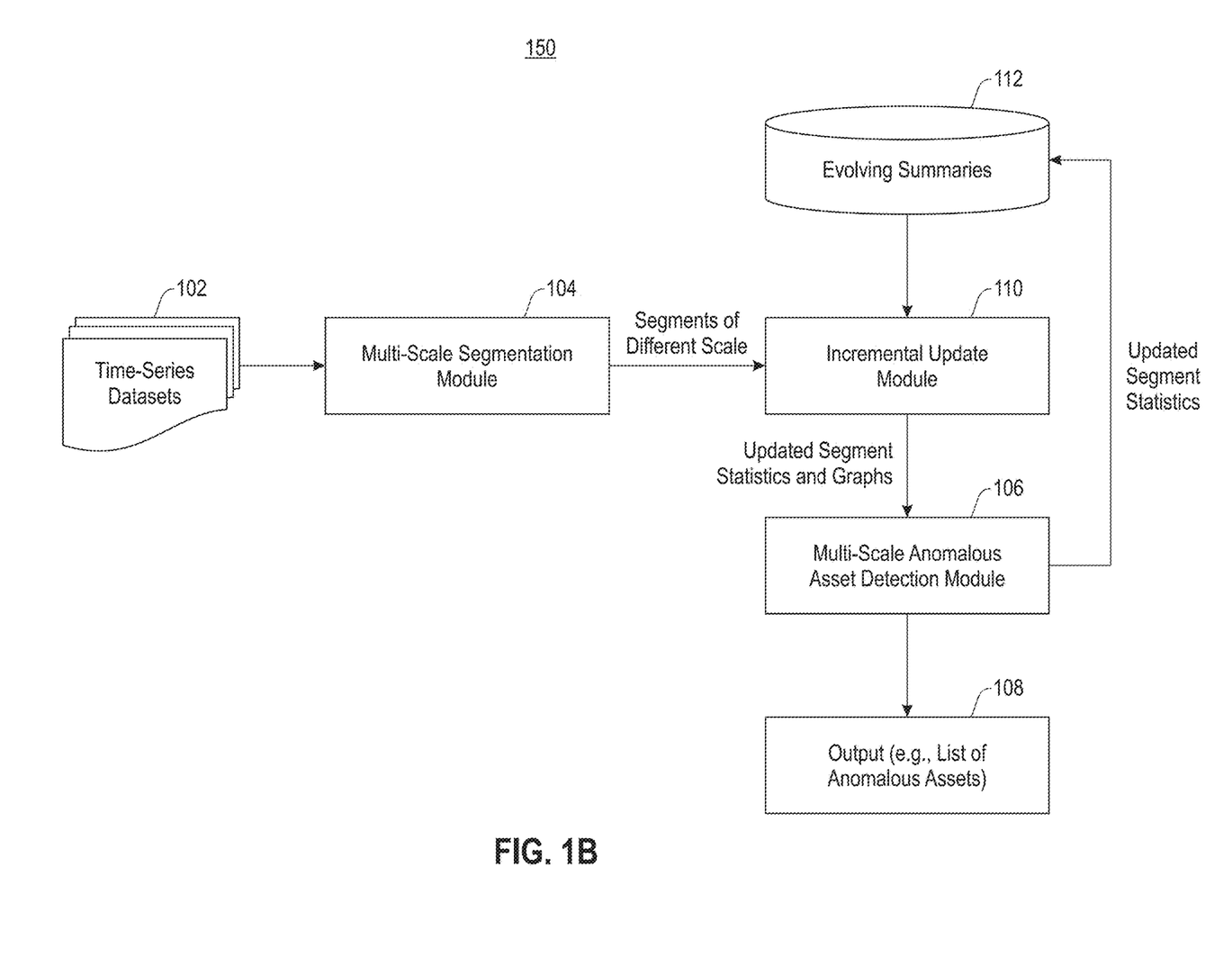

FIGS. 1A-1B are diagrams illustrating a system architecture in accordance with example embodiments of the subject matter described herein. FIG. 1A shows an 'offline' component 100 of the system architecture used for batch processing, and the system architecture in FIG. 1B shows an 'online' component 150 of the system architecture for incremental processing of data on-the-fly. By way of illustration, the system architecture includes a multi-scale segmentation module 104, a multi-scale anomalous asset detection module 106, and an incremental update module 110.

The multi-scale segmentation module 104 receives one or more time-series datasets 102. The datasets 102 may be, for example, multivariate time-series datasets (MTD) which include time-series data for different assets (for example, IoT sensor data). As an example, an MTD may include timestamped rows having different fields, wherein each field is a sensor variable. Also, in some example embodiments the datasets 102 may include at least one univariate dataset.

Figure 2:
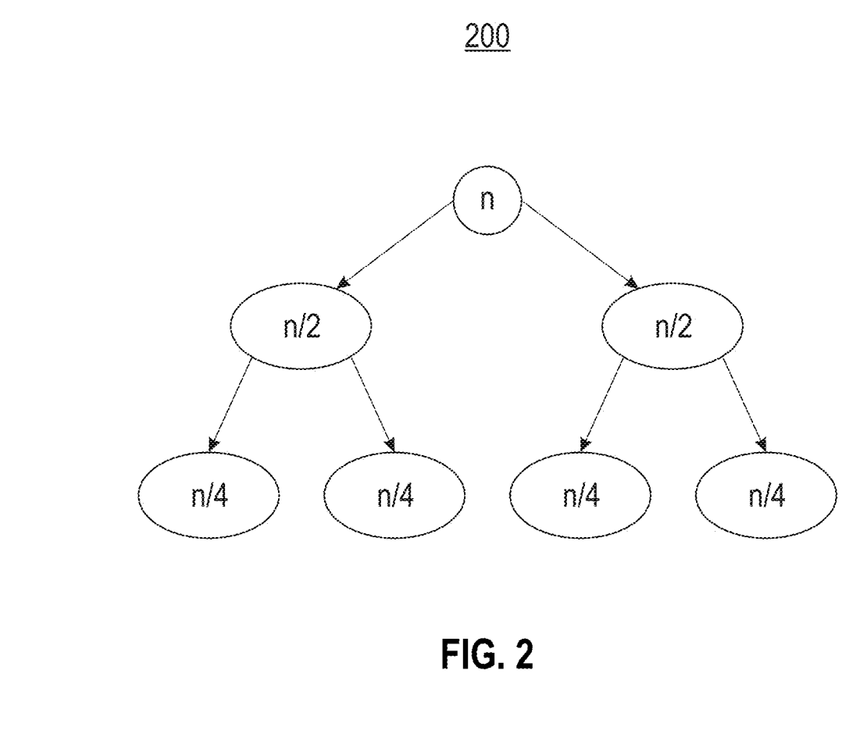
FIG. 2 is a diagram for multi-scale segmentation in accordance with one or more example embodiments.

The multi-scale segmentation module 104 creates segments of the time series datasets 102 of different sizes. FIG. 2 depicts a non-limiting example of multi-scale segmentation 200 in accordance with one or more example embodiments. As shown in FIG. 2, it is assumed the total data duration for the time series of each asset's data is n, so that the sizes may be, for example, n, n/2, n/4, wherein each size represents a different time scale. For instance, if the total time series duration is n=2 months, then the multi-scale segmentation module may create segments of 1 month, 15 days, 7.5 days, etc. The multi-scale segmentation module 104 outputs segments having different scales.

According to at least some example embodiments, the multi-scale anomalous asset detection module 106 fits each asset segment with a multivariate Gaussian distribution to obtain a mean-vector and a co-variance matrix. The covariance matrix may be retrieved using, for example, an empirical co-variance estimation, graphical lasso etc. The multi-scale anomalous asset detection module 106 then computes the distance between segments. For example, for each time scale, the segments may be compared by computing the J-Coefficient, $J_{i,j}$, and applying a distance function to obtain a M×M distance matrix (DM) wherein M is the number of segments of all assets of a given scale, and each entry (i,j) in the matrix is the distance function on the J-coefficient for the distributions for segments i and j. The distance function may be defined as follows:

$$d(J_{i,j}) = e^{-\left(\frac{J_{i,j}}{k}\right)}, \text{ where } k \text{ is constant.} \quad (1)$$

It is to be appreciated that other metrics may also be used in place of the J-Coefficient, such as KL-divergence, for example.

Figure 3A:
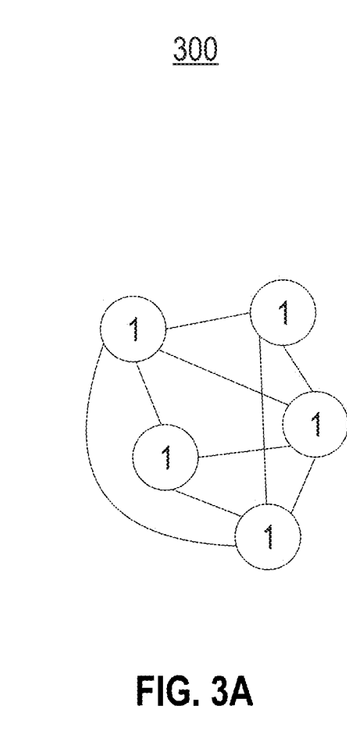
FIG. 3A depicts an example of a segment graph in accordance with example embodiments.

The multi-scale anomalous asset detection module 106 constructs a segment similarity graph for each scale using the distance matrix. FIG. 3A shows an example of a segment graph 300 wherein the vertices represent data coming from all assets for a given-time scale, and the edges represent the distance between the distributions of the data represented by the vertices. In some example embodiments, each vertex in the segment graph may be identified by an (asset id, time-chunk) pair, where the time-chunk size corresponds to the given time-scale. In the example shown in FIG. 3A, the segment graph 300 includes different segments for a single asset (i.e., asset '1'). To determine whether a given asset k is anomalous, the multi-scale anomalous asset detection module 106:

a) Determines an isolation-metric of asset k within a graph for a given scale based on the following equation:

$$\text{Isolation}(k) = \Sigma_{i \in A_K} f(i) \quad (2)$$

$$f(i) = \begin{cases} 1, & \frac{d_i - \mu_{-i}}{\sigma_{-i}} \geq A_t \\ 0, & \text{otherwise} \end{cases}$$

In equation (2) $A_k$ are the segments belonging to asset k, S is the set of all segments, (μ–i, δ–i) are the "leave 'i' out" mean and standard deviation of all segment-pair distances within the graph, and $d_i$ is the average distance between 'i' and all other nodes.

b) Aggregates the isolation metric for the asset k across all scales. This is the total isolation of the asset. An asset is marked anomalous if its isolation metric is higher than a threshold $A_t$.

c) Computes groupings of anomalous assets based on their anomalous segment closeness using the following pairwise separation metric:

$$f(l,m) = \Sigma_i^{A_l} \Sigma_j^{A_m}(|i-j|+d_{i,j}) \quad (3)$$

wherein $A_l$ and $A_m$ are the anomalous segments belonging to asset l and m, and $d_{i,j}$ is the distance between segments (i, j) belonging to (l, m) respectively. Equation (3) yields a ranking for each asset pair which can be used to identify the propensity of common cause of anomaly.

Figure 3B:
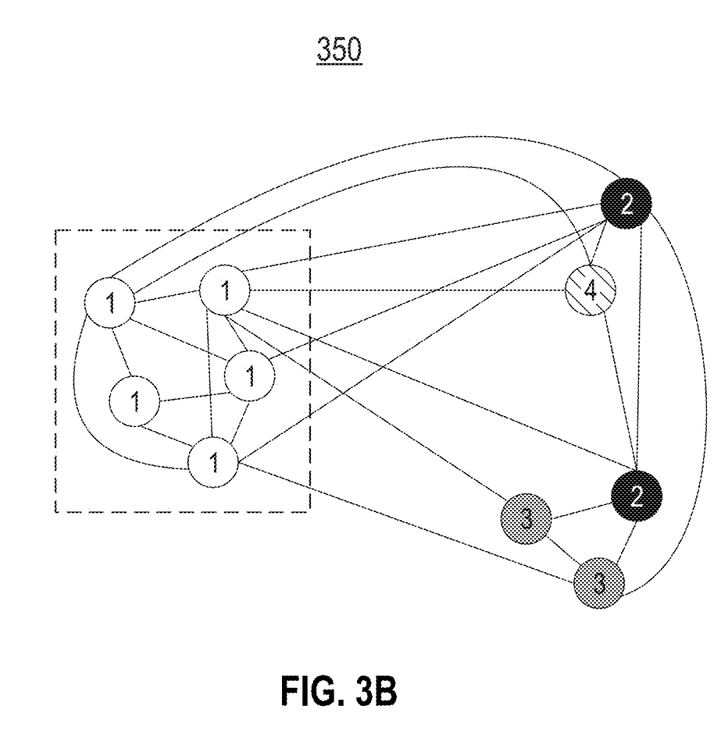
FIG. 3B depicts an example of a segment graph with segments from four assets in accordance with example embodiments.

FIG. 3B is a segment graph 350 with segments from four different assets, namely, assets 1-4. The segment graph in FIG. 3B shows anomalous segment closeness between the assets. In particular, segments of asset 3 are closely grouped with a segment of asset 2, and a segment of asset 4 is closely grouped with a segment of asset 2.

The multi-scale anomalous asset detection module 106 generates output 108 in the form of, for example, a list of anomalous assets.

Figure 4:
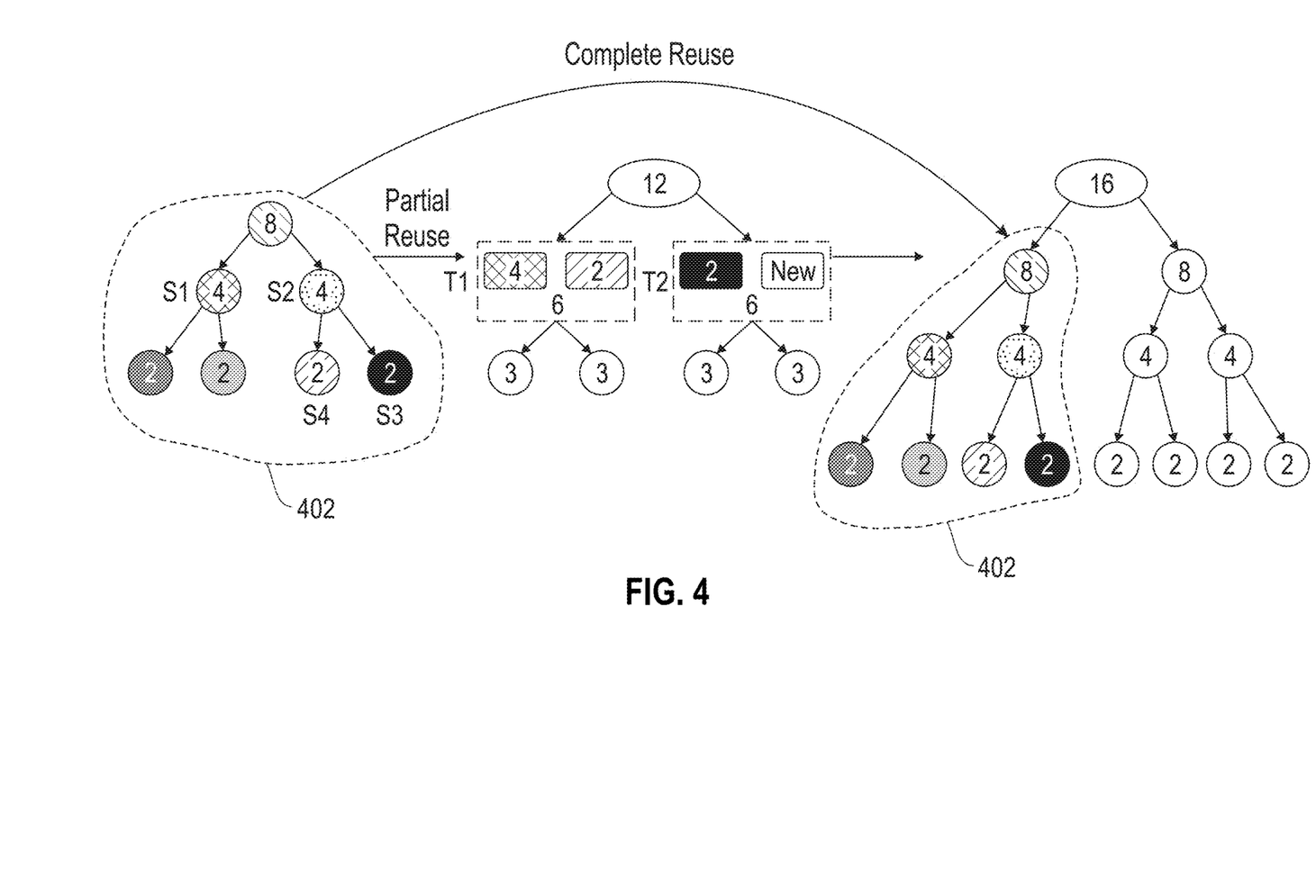
FIG. 4 is a diagram illustrating techniques for an incremental update process according to one or more example embodiments.

The incremental update module 110 allows for computation reuse and incremental update to the asset statistics. In case of complete reuse, stored historical results may be directly reused; whereas with partial reuse, parts of the computation have to be performed. FIG. 4 is a diagram illustrating partial reuse and complete reuse in accordance with one or more example embodiments. In the example shown in FIG. 4, S1 and S4 are re-used to compute T1. In the case of T2, S3 supplies a part of result of T2, while the mean and the covariance matrix for the remaining four elements in T2 must be re-computed. The selection of the re-use configuration may be based on a greedy approach to decide the configuration with a least possible computation requirement, for example. In a similar manner, computations can be completely reused as depicted by the nodes within 402 of FIG. 4.

For the online component 150, the incremental update module 110 receives the segments of different scale from the multi-scale segmentation module 104, and evolving summaries 112 corresponding to stored historical results as depicted in FIG. 1B. The evolving summaries 112 may include stored computational results corresponding to previous data. As new data arises, the stored computational results may be updated. The evolving summaries 112 allow, for example, the multi-scale anomalous asset detection module 106 to reuse at least in part these previous computation results.

The incremental update module 110 outputs updated segment statistics and graphs for the segments received from multi-scale segmentation module 104, which may then be processed by multi-scale anomalous asset detection module 106 in a manner similar to that described above. Additionally, the evolving summaries 112 are updated using updated segment statistics output by multi-scale anomalous asset detection module 106.

Figure 5:
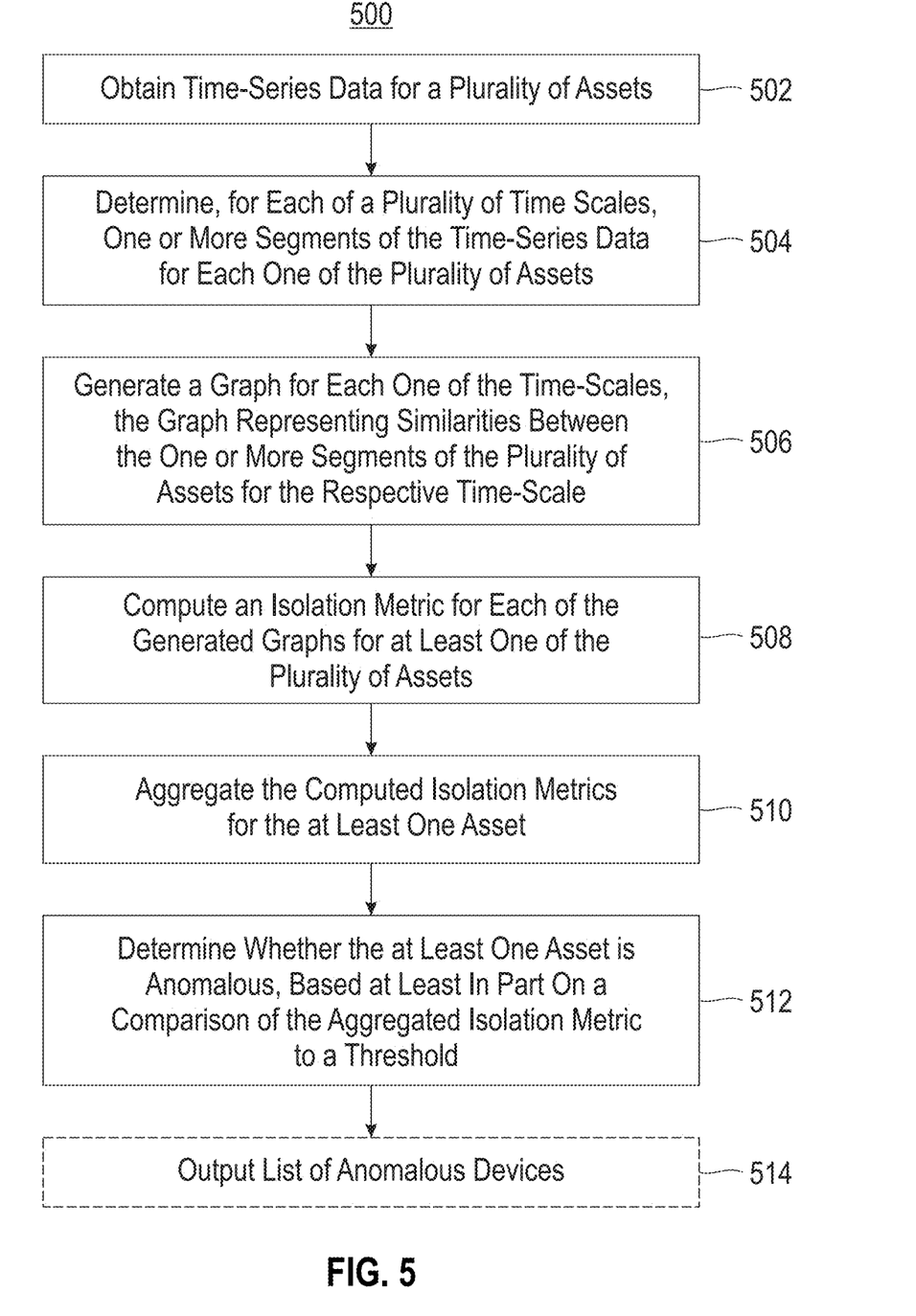
FIG. 5 is a flow diagram illustrating techniques according to an embodiment of the invention.

FIG. 5 is a flow diagram illustrating a process 500 according to an embodiment of the present invention. Step 502 includes obtaining time-series data for each one of a plurality of assets.

Step 504 includes determining, for each of a plurality of time scales, one or more segments of the time-series data for each one of the plurality of assets.

Step 506 includes generating a graph for each one of the time-scales, the graph representing similarities between the one or more segments of the plurality of assets for the respective time-scale.

Step 508 includes computing an isolation metric for each of the generated graphs for at least one of the plurality of assets.

Step 510 includes aggregating the computed isolation metrics for the at least one asset.

Step 512 includes determining whether the at least one asset is anomalous, based at least in part on a comparison of the aggregated isolation metric to a threshold.

Optionally, the process 500 may include step 514 which includes, in response to determining the at least one asset is anomalous, outputting an indication of the at least one asset via a graphical user interface.

The time-series data for each one of the plurality of assets may correspond to a time period, n, and the determining of step 504 may include determining the plurality of time-scales using a binary splitting method.

The generating of step 506 may include calculating (i) a mean-vector and (ii) a co-variance matrix for each of the one or more segments of each of the respective time-scales. Said calculating may include: re-using one or more of: (i) at least a part of a previous mean-vector calculation corresponding to historical time-series data for the at least one asset and (ii) at least a part of a previous co-variance matrix calculation corresponding to historical time-series data for the at least one asset.

The obtaining of step 502 may include fitting each of the one or more segments of each of the respective time scales with a multivariate Gaussian distribution.

The generating of step 506 may include, for each of the plurality of time-scales: computing a J-Coefficient between pairs of the one or more segments for the respective time-scale; and applying a distance function to the J-Coefficients to obtain a M×M distance matrix, wherein M is the number of the one or more segments of the at least one asset in the respective time scale, and each entry in the distance matrix is the value of the distance function for a given one of the J-Coefficients.

Each of the graphs may include: a set of nodes representing distributions of the time-series data from the plurality of assets for the respective time-scale; and one or more edges representing the value of the distance function between the set of nodes.

The at least one asset may include two or more of the plurality of assets, and process 500 may include grouping the segments corresponding to the two or more assets for a given one of the time-scales into one or more groups; and determining whether the two or more assets are anomalous based on said grouping. Said grouping may be based on an unsupervised graph clustering technique.

The time-series data for a given one of the assets may include (i) a plurality of time-stamps and (ii) one or more values from at least one sensor of the given asset.

The group of assets may correspond to at least a part of one or more of: (i) a heating system, (ii) a ventilation system, (iii) a cooling system, and (iv) a turbine system.

Another example of an embodiment of the subject described herein includes a process comprising obtaining time-series data for each of a plurality of assets; determining, for each of a plurality of time scales, one or more segments of the time-series data for each one of the plurality of assets; calculating, for each respective time-scale, similarities between the segments of the time-series data in the respective time-scale for the plurality of assets; for each given asset in the plurality of assets: (i) determining an isolation metric based at least in part on whether the one or more segments of the given asset for a given time-scale are anomalous based at least in part on said similarities, (ii) aggregating the isolation metric for the given asset across the plurality of time-scales, and (iii) marking the given asset as anomalous in response to the isolation metric satisfying a threshold; grouping assets that are marked as anomalous into one or more groups, wherein said grouping is based at least in part on comparisons of the anomalous segments of the anomalous assets; and identifying one or more common root causes of said anomalous assets based at least in part on said grouping.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 6:
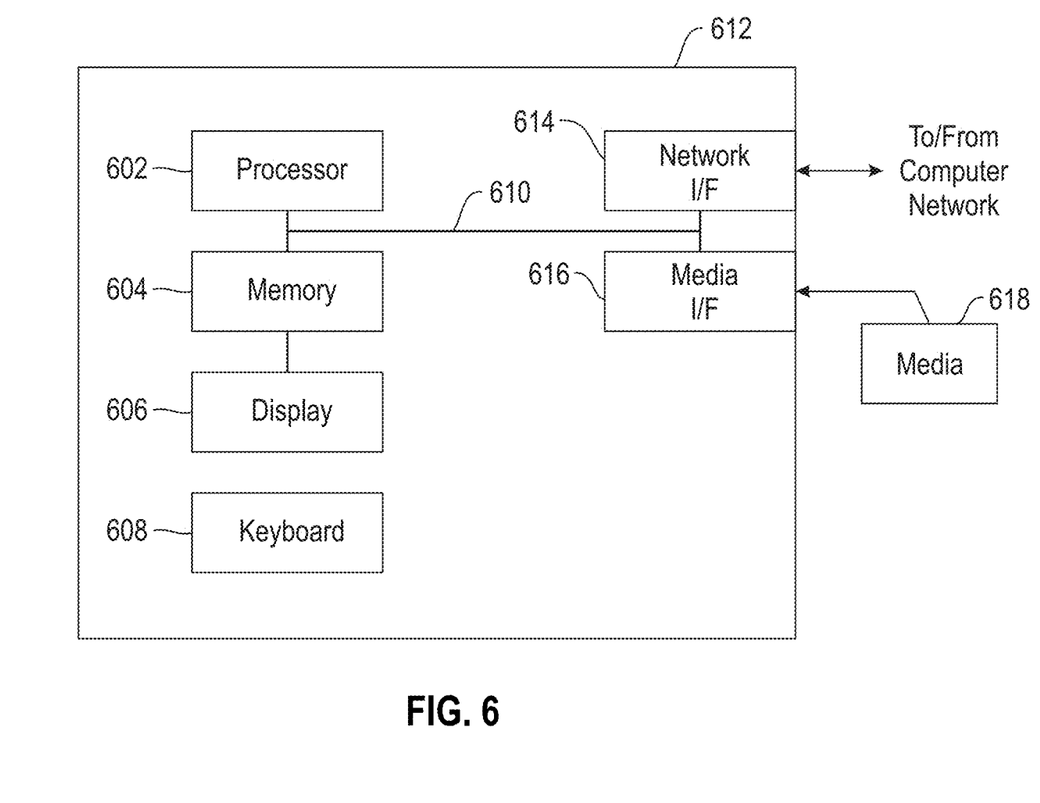
FIG. 6 is a system diagram of an exemplary computer system on which at least one embodiment of the invention can be implemented.

Additionally, an embodiment of the present invention can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
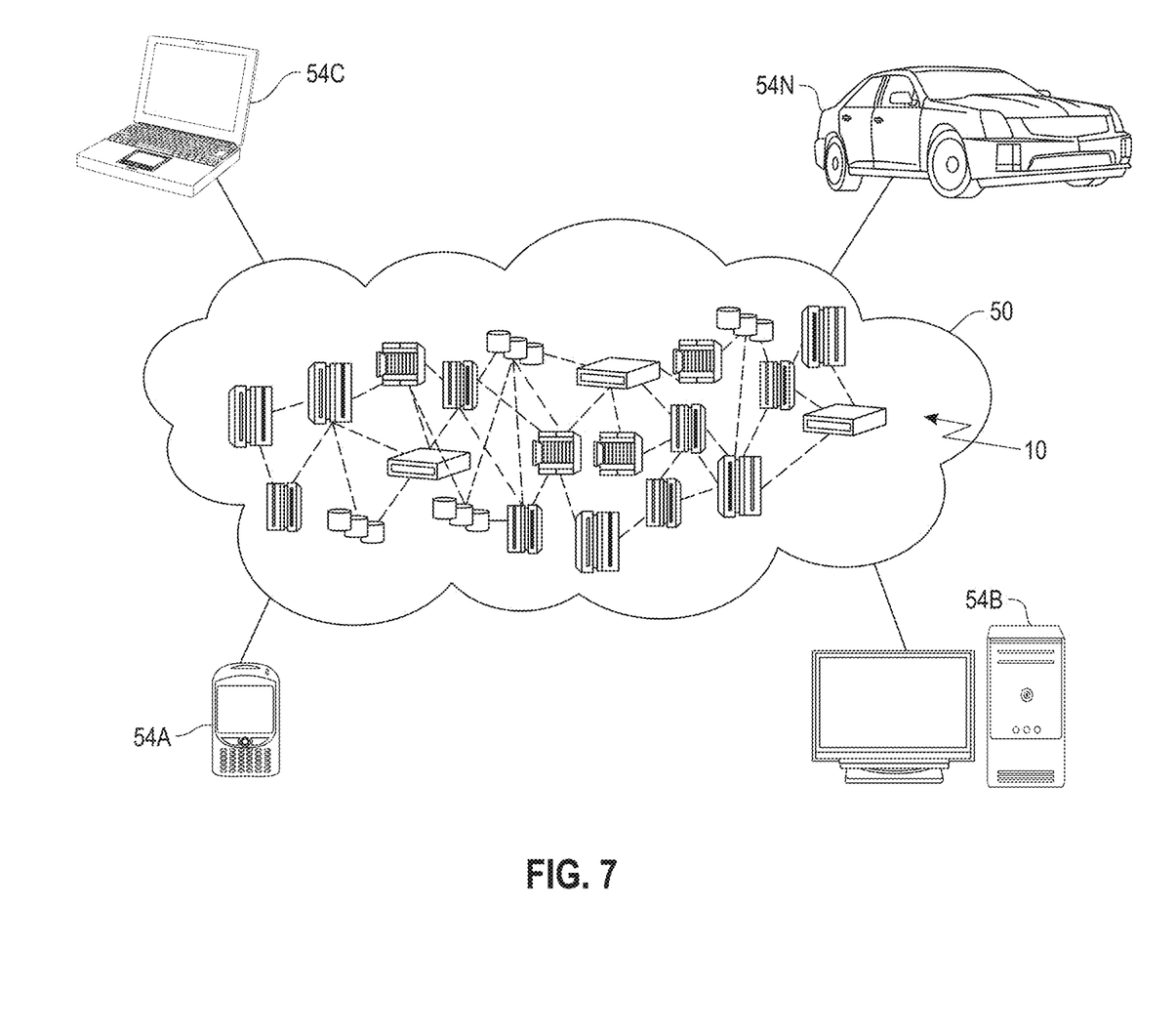
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
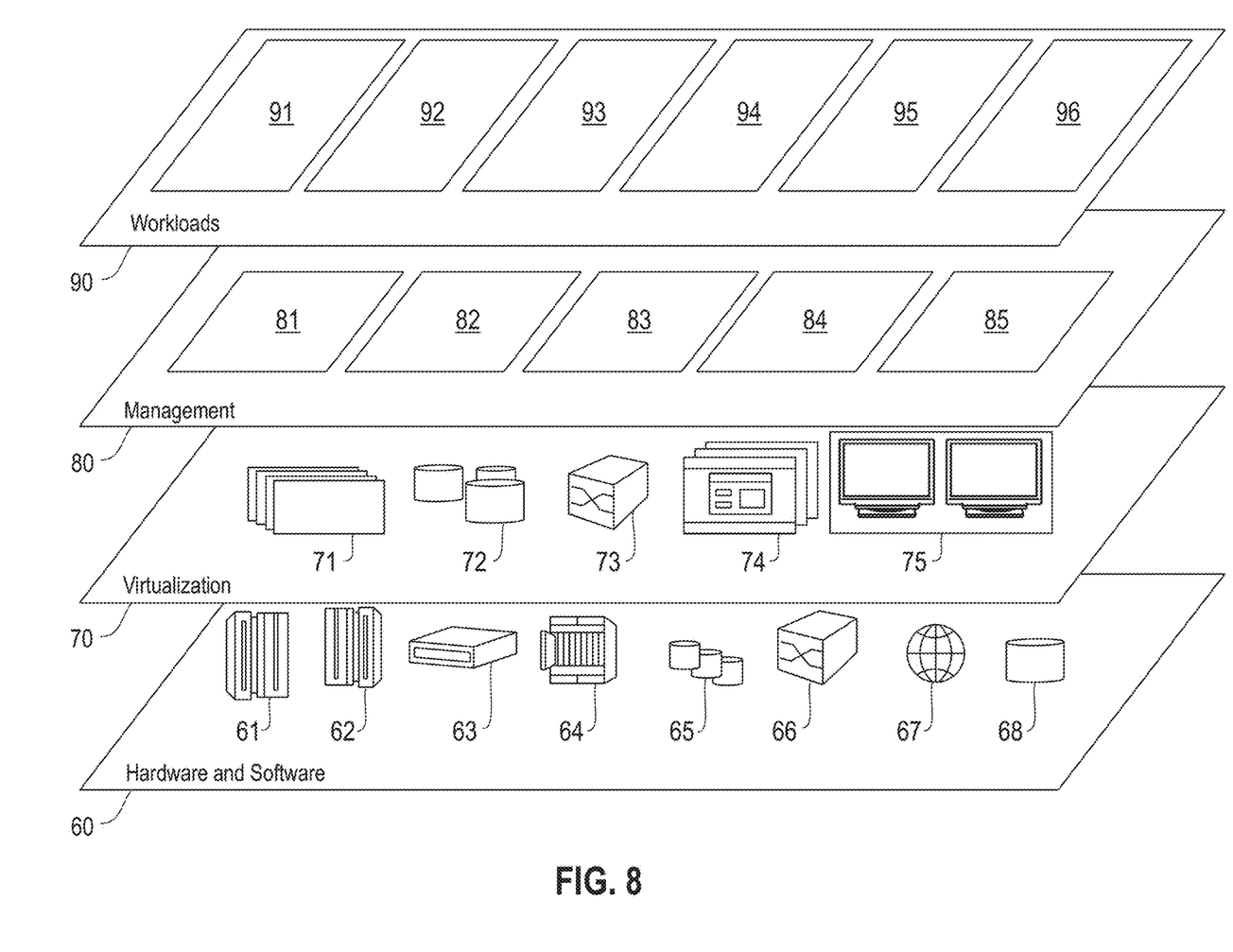
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and asset anomaly detection 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, rapid unsupervised anomaly comparison across multiple assets (such as IoT assets, for example) and time-scales using offline batch processing and/or through incremental processing of multi-modal data streams on-the-fly. Also, at least one embodiment of the present invention may provide a beneficial effect such as, for example, increasing efficiency of anomaly comparison by reusing parts of previous computations and/or models.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   obtaining time-series data for each one of a plurality of assets;
   determining, for each of a plurality of time scales, one or more segments of the time-series data for each one of the plurality of assets;
   generating a graph for each one of the time-scales, the graph representing similarities between the one or more segments of the plurality of assets for the respective time-scale, wherein the generating comprises calculating a mean-vector and a co-variance matrix for each of the one or more segments of each of the respective time-scales, wherein said calculating comprises re-using one or more of: (i) at least a part of a previous mean-vector calculation corresponding to historical time-series data for the at least one asset and (ii) at least a part of a previous co-variance matrix calculation corresponding to historical time-series data for the at least one asset;
   computing an isolation metric for each of the generated graphs for at least one of the plurality of assets, wherein computing the isolation metric for a given one of the generated graphs comprises: computing, for each given one of the one or more segments corresponding to the at least one asset, a mean and a standard deviation of distances within the graph between segment pairs of the at least one asset that do not include the given segment;
   aggregating the computed isolation metrics for the at least one asset; and
   determining whether the at least one asset is anomalous, based at least in part on a comparison of the aggregated isolation metric to a threshold;
   wherein the method is carried out by at least one computing device.

2. The computer-implemented method of claim 1, wherein the time-series data for each one of the plurality of assets correspond to a time period, n, and wherein said determining of the one or more segments comprises determining the plurality of time-scales using a binary splitting method.

3. The computer-implemented method of claim 1, wherein said obtaining comprises:
   fitting each of the one or more segments of each of the respective time scales with a multivariate Gaussian distribution.

4. The computer-implemented method of claim 1, wherein said generating comprises, for each of the plurality of time-scales:
   computing a J-Coefficient between pairs of the one or more segments for the respective time-scale; and
   applying a distance function to the J-Coefficients to obtain a M×M distance matrix, wherein M is the number of the one or more segments of the at least one asset in the respective time scale, and each entry in the distance matrix is the value of the distance function for a given one of the J-Coefficients.

5. The computer-implemented method of claim 4, wherein each of the graphs comprises:
   a set of nodes representing distributions of the time-series data from the plurality of assets for the respective time-scale; and
   one or more edges representing the value of the distance function between the set of nodes.

6. The computer-implemented method of claim 4, wherein the at least one asset comprises two or more of the plurality of assets, and wherein the method comprises:
   grouping the segments corresponding to the two or more assets for a given one of the time-scales into one or more groups; and
   determining whether the two or more assets are anomalous based on said grouping.

7. The computer-implemented method of claim 6, wherein said grouping is based on an unsupervised graph clustering technique.

8. The computer-implemented method of claim 1, comprising:
   outputting, in response to determining the at least one asset is anomalous, an indication of the at least one asset via a graphical user interface.

9. The computer-implemented method of claim 1, wherein the time-series data for a given one of the assets comprise (i) a plurality of time-stamps and (ii) one or more values from at least one sensor of the given asset.

10. The computer-implemented method of claim 1, wherein the group of assets corresponds to at least a part of one or more of: (i) a heating system, (ii) a ventilation system, (iii) a cooling system and (iv) a turbine system.

11. A computer program product comprising a computer readable storage medium having program instructions embodied therewith, the program instructions executable by a computing device to cause the computing device to at least:
   obtain time-series data for each one of a plurality of assets;

determine, for each of a plurality of time scales, one or more segments of the time-series data for each one of the plurality of assets;

generate a graph for each one of the time-scales, the graph representing similarities between the one or more segments of the plurality of assets for the respective time-scale, wherein the generating comprises calculating a mean-vector and a co-variance matrix for each of the one or more segments of each of the respective time-scales, wherein said calculating comprises re-using one or more of: (i) at least a part of a previous mean-vector calculation corresponding to historical time-series data for the at least one asset and (ii) at least a part of a previous co-variance matrix calculation corresponding to historical time-series data for the at least one asset;

compute an isolation metric for each of the generated graphs for at least one of the plurality of assets, wherein computing the isolation metric for a given one of the generated graphs comprises: computing, for each given one of the one or more segments corresponding to the at least one asset, a mean and a standard deviation of distances within the graph between segment pairs of the at least one asset that do not include the given segment;

aggregate the computed isolation metrics for the at least one asset; and determine whether the at least one asset is anomalous, based at least in part on a comparison of the aggregated isolation metric to a threshold.

12. The computer program product of claim 11, wherein the time-series data for each one of the plurality of assets correspond to a time period, n, and wherein said determining of the one or more segments comprises determining the plurality of time-scales using a binary splitting method.

13. The computer program product of claim 11, wherein said obtaining comprises:
fitting each of the one or more segments of each of the respective time scales with a multivariate Gaussian distribution.

14. The computer program product of claim 11, wherein said generating comprises, for each of the plurality of time-scales:
computing a J-Coefficient between pairs of the one or more segments for the respective time-scale; and
applying a distance function to the J-Coefficients to obtain a M×M distance matrix, wherein M is the number of the one or more segments of the at least one asset in the respective time scale, and each entry in the distance matrix is the value of the distance function for a given one of the J-Coefficients.

15. A system comprising:
a memory; and
at least one processor operably coupled to the memory and configured for:

obtaining time-series data for each one of a plurality of assets;

determining, for each of a plurality of time scales, one or more segments of the time-series data for each one of the plurality of assets;

generating a graph for each one of the time-scales, the graph representing similarities between the one or more segments of the plurality of assets for the respective time-scale, wherein the generating comprises calculating a mean-vector and a co-variance matrix for each of the one or more segments of each of the respective time-scales, wherein said calculating comprises re-using one or more of: (i) at least a part of a previous mean-vector calculation corresponding to historical time-series data for the at least one asset and (ii) at least a part of a previous co-variance matrix calculation corresponding to historical time-series data for the at least one asset;

computing an isolation metric for each of the generated graphs for at least one of the plurality of assets, wherein computing the isolation metric for a given one of the generated graphs comprises: computing, for each given one of the one or more segments corresponding to the at least one asset, a mean and a standard deviation of distances within the graph between segment pairs of the at least one asset that do not include the given segment;

aggregating the computed isolation metrics for the at least one asset; and determining whether the at least one asset is anomalous, based at least in part on a comparison of the aggregated isolation metric to a threshold.

16. The computer-implemented method of claim 1, wherein said re-using comprises applying a greedy algorithm to determine a configuration having a least possible computation requirement to be re-used in said computing.

17. The computer program product of claim 11, wherein said re-using comprises applying a greedy algorithm to determine a configuration having a least possible computation requirement to be re-used in said computing.

18. The computer program product of claim 11, wherein the program instructions cause the computing device to:
output, in response to determining the at least one asset is anomalous, an indication of the at least one asset via a graphical user interface.

19. The system of claim 15, wherein said re-using comprises applying a greedy algorithm to determine a configuration having a least possible computation requirement to be re-used in said computing.

20. The system of claim 15, wherein the at least one processor is configured for:
outputting, in response to determining the at least one asset is anomalous, an indication of the at least one asset via a graphical user interface.

* * * * *